US012689652B1

(12) United States Patent
Arora et al.

(10) Patent No.: US 12,689,652 B1
(45) Date of Patent: Jul. 21, 2026

(54) METHODS AND DEVICES FOR PROTECTING A NETWORK SERVICE DEVICE

(71) Applicant: F5, Inc., Seattle, WA (US)

(72) Inventors: Judge K. Arora, Eastsound, WA (US); Sandeep Agarwal, San Jose, CA (US); Timothy S. Michels, Greenacres, WA (US); Bruce A Zurfluh, Newman Lake, WA (US)

(73) Assignee: F5, Inc., Seattle, WA (US)

( * ) Notice: Subject to any disclaimer, the term of this patent is extended or adjusted under 35 U.S.C. 154(b) by 34 days.

(21) Appl. No.: 18/758,474

(22) Filed: Jun. 28, 2024

(51) Int. Cl.
*G06F 21/00* (2013.01)
*H04L 9/40* (2022.01)

(52) U.S. Cl.
CPC ...... *H04L 63/1458* (2013.01); *H04L 63/0236* (2013.01); *H04L 63/1425* (2013.01)

(58) Field of Classification Search
CPC ............. H04L 63/1458; H04L 63/0236; H04L 63/1425
See application file for complete search history.

(56) References Cited

U.S. PATENT DOCUMENTS

| | | | |
|---|---|---|---|
| 8,893,294 B1 | 11/2014 | Steele, III | |
| 2004/0088570 A1 | 5/2004 | Roberts | |
| 2005/0114658 A1 | 5/2005 | Dye | |
| 2005/0249214 A1* | 11/2005 | Peng | .................. H04L 63/1458 709/224 |

| | | | |
|---|---|---|---|
| 2011/0214182 A1 | 9/2011 | Adams | |
| 2013/0333032 A1 | 12/2013 | Delatorre | |
| 2014/0298469 A1 | 10/2014 | Marion | |
| 2015/0067848 A1 | 3/2015 | Baikalov | |
| 2015/0121529 A1 | 4/2015 | Quinlan | |
| 2015/0288709 A1* | 10/2015 | Singhal | ............... H04L 63/1408 726/23 |

(Continued)

OTHER PUBLICATIONS

Phu H. Phung, David Sands, and Andrey Chudnov; Lightweight self-protecting JavaScript. In Proceedings of the 4th International Symposium on Information, Computer, and Communications Security (ASIACCS '09). Association for Computing Machinery, New York, NY, USA, 47-60 (ACM 2009) (Year: 2009).

(Continued)

*Primary Examiner* — Michael M Lee
(74) *Attorney, Agent, or Firm* — Troutman Pepper Locke LLP

(57) ABSTRACT

Methods, non-transitory computer readable media, network traffic manager apparatuses, and systems that protects a network service device are disclosed. The method includes in response to receiving a notification indicating an attack risk to the network service device, activates a timer for a predetermined time period during which a first request to establish a connection with the network service device is received. The method determines whether the first request originated from a legitimate source and adds the legitimate source to a trust list. After expiration of the timer, the method receives a data packet to be transmitted to the network service device and determines whether the data packet originated from any of the trusted sources in the trust list. The method restricts a transmission of data packet(s) not originated from any of the trusted sources in the trust list to the network service device.

20 Claims, 4 Drawing Sheets

(56) References Cited

U.S. PATENT DOCUMENTS

| 2016/0063218 | A1 | 3/2016 | Nachenberg | |
| 2017/0223052 | A1 | 8/2017 | Stutz | |
| 2018/0020024 | A1 | 1/2018 | Chao | |
| 2018/0091547 | A1* | 3/2018 | St. Pierre | H04L 63/1458 |
| 2018/0167412 | A1 | 6/2018 | Barrett | |
| 2018/0219910 | A1 | 8/2018 | Greenshpan | |
| 2018/0241774 | A1 | 8/2018 | Zhao | |
| 2019/0068640 | A1 | 2/2019 | Araujo | |
| 2019/0087574 | A1 | 3/2019 | Schmidtler | |
| 2019/0318081 | A1 | 10/2019 | Gupta | |
| 2019/0334940 | A1 | 10/2019 | Bar Noy | |
| 2020/0204589 | A1 | 6/2020 | Strogov | |
| 2020/0351287 | A1* | 11/2020 | Lees | H04L 61/10 |
| 2021/0232755 | A1 | 7/2021 | Jadhav | |
| 2025/0126141 | A1* | 4/2025 | Uthaman | H04L 63/1425 |

OTHER PUBLICATIONS

F5—Enable Advanced Application Services Across Your Container Environment https://www.f5.com/products/big-ipservices/container-ingress-servic:es downloaded Sep. 28, 2023.
F5—What Can Big-iP PEM Do for You? https://www.f5.com/products/big-ip-services/policy-enforcement-manager downloaded Sep. 28, 2023.
F5—More Than Load Balancing https:t/www.f5.com/products/big-ip-seivicestlocal-traffic-manager downloaded Sep. 28, 2023.
F5—Zero Trust Begins with Secure Access to All Apps https://www.f5.corniproducts/big-ip-se1vlces/access-pollcy-manager downloaded Sep. 28, 2023.
F5—Secure Your Network from Core to Edge https://www.f5.com/products/big-ip-se1vices/advanced-firewall-manager downloaded Sep. 28, 2023.
F5—Sophisticated Attacks Require Sophisticated Solutions https://www.f5.com/products/big-ip-seivices/ddos-hybrid- defender downloaded Sep. 28, 2023.
F5 Networks Inc., "BIG-IP Application Security Manager: Gelling Started®", Manual, Nov. 13, 2017, 46 pages, vol. 13.1, F5 Networks, Inc., Retrieved from the Inlernet: <hllps://lechdocs.f5.com/kb/en-us/producls/big-ip_asm/ manuals/producl/asm-getting-started-13-1-0 . html>.
F5 Networks Inc., "Assigning Attack Signatures to Security Policies", Manual, 2019, 6 pages, F5 Networks, Inc., Retrieved from the Internet: <hllps://lechdocs.f5.com/kb/en-us/producls/big-ip_asm/manuals/producl/big-ip-asm-attack-and-bol-signatures-14-1-0/01. hi ml#guid-9e8b2b2f-1325-4 715-a879-311 c802b2e97>.
F5 Networks Inc., "Big-IP 15.0.1 New and Installation" Release Notes, 2019, 33 pages, Version 15.0.1, F5 Networks, Inc., Retrieved from the Internet :<hllps://lechdocs.f5.com/kb/en-us/producls/big-ip_Ilm/releasenoles/product/relnole-bigip-15-0-1.hlml>.
Villing, Julian, "Investigating TCP SYN Flood Mitigation Techniques in the Wild, " Network Architectures and Services, pp. 67-70, May 2019.
F5 Distributed Cloud DDOS Mitigation Services, 2024.
BIG-IP Local Traffic Manager, 2024.
Extended EP Search Report issued in EP Application No. 25186211. 6, mailed on Jul. 17, 2025, 11 pp.

* cited by examiner

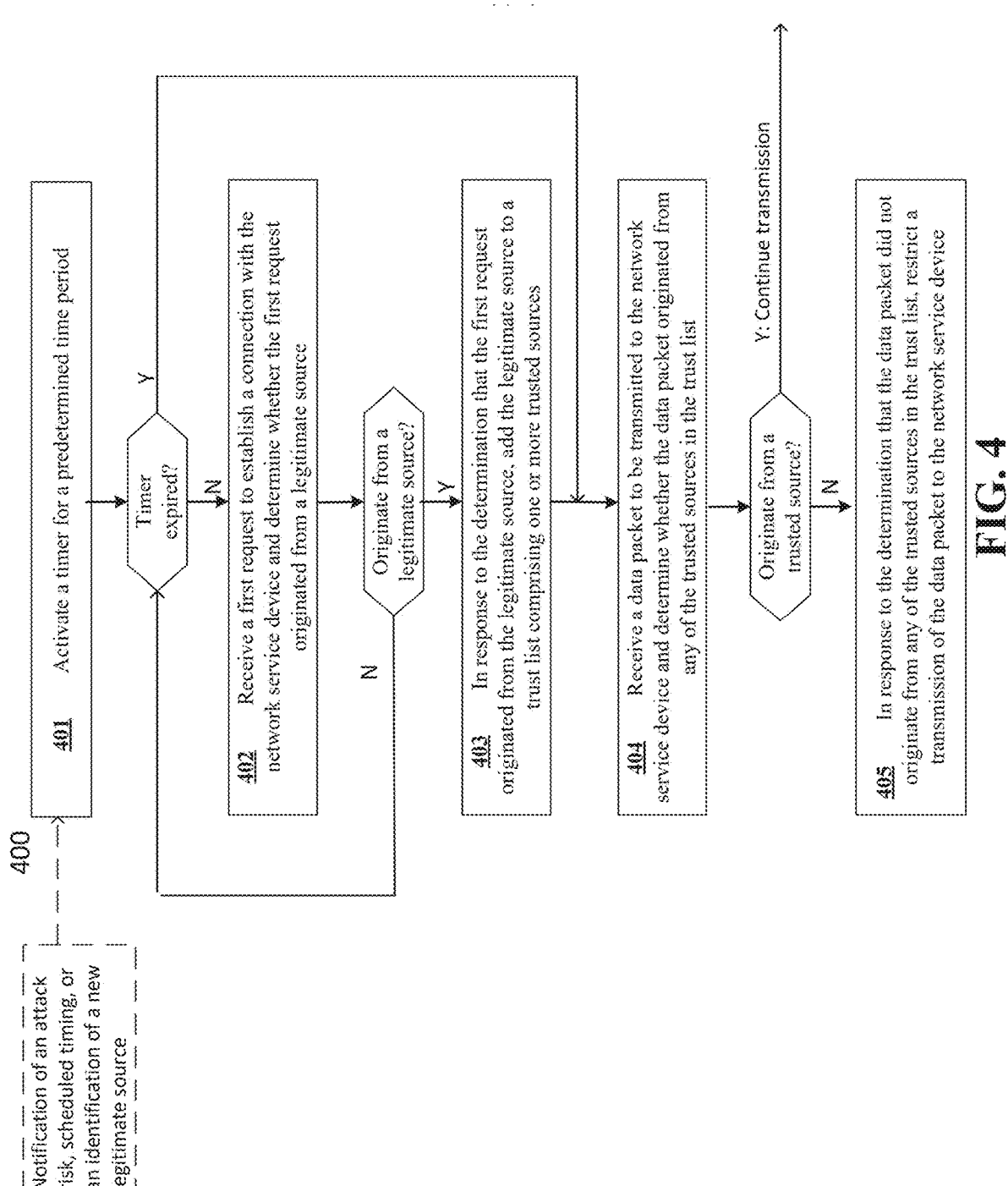

400

Notification of an attack risk, scheduled timing, or an identification of a new legitimate source

401 Activate a timer for a predetermined time period

Timer expired?

402 Receive a first request to establish a connection with the network service device and determine whether the first request originated from a legitimate source Originate from a legitimate source?

403 In response to the determination that the first request originated from the legitimate source, add the legitimate source to a trust list comprising one or more trusted sources

404 Receive a data packet to be transmitted to the network service device and determine whether the data packet originated from any of the trusted sources in the trust list Originate from a trusted source?

Y: Continue transmission

405 In response to the determination that the data packet did not originate from any of the trusted sources in the trust list, restrict a transmission of the data packet to the network service device

FIG. 4

METHODS AND DEVICES FOR PROTECTING A NETWORK SERVICE DEVICE

FIELD

This disclosure relates to protect a network service device, in particular, to protect a network service device in a network traffic management system from processing suspicious data packets.

BACKGROUND

As the development of various wired and wireless technologies, communication technologies are propelling the world towards a progressively interconnected and networked society. The swift expansion of mobile communications and technological advancements have render greater demand for enhanced network service capacity and connectivity. Among various factors, network service security plays an important role to ensure network service performance and availability. Given the escalating demand for cybersecurity whereas persistently rising number of attacks leading to information leakage, a better protection of a network service device in various communicative connections via a network is desired.

Therefore, various protection mechanisms have been arranged to protect service devices, such as an application server. However, due to the complexities of network architecture and networking protocols, protection mechanisms normally are limited to a specific applicable scenario. By way of example, to mitigate TCP packet floods during a DDoS attack, some specific mechanisms are used to differentiate malicious requests from valid TCP connection requests (e.g., by negotiating SYN Cookies, or sending a challenge response) in symmetric routing mode. But those exemplary mechanisms are limited to symmetric routing mode and only apply for new connection requests. Accordingly, there is a need of protection solutions which are applicable to other execution environments and for more data packets rather than only for new connection requests.

SUMMARY

This disclosure is directed to methods and devices related to protecting a network service device. More specifically, the methods and devices relate to protect a network service device in a network traffic management system. Relevant non-transitory computer readable medium and network traffic management systems are also disclosed.

According to an aspect of the disclosure, a method for protecting a network service device is disclosed. The method may be implemented by a network traffic management system, wherein the network traffic management system may comprise one or more network traffic management apparatuses, client devices, or server devices. The method may comprise activate a timer for a predetermined time period. The method may further comprise during the activation of the timer, receive a first request to establish a connection with the network service device and determine whether the first request originated from a legitimate source. The method may further comprise in response to the determination that the first request originated from the legitimate source, add the legitimate source to a trust list, the trust list comprising one or more trusted sources. The method further comprises after expiration of the timer, receive a data packet to be transmitted to the network service device and determine whether the data packet originated from any of the trusted sources in the trust list, and in response to the determination that the data packet did not originate from any of the trusted sources in the trust list, restrict a transmission of the data packet to the network service device.

According to another aspect of the disclosure, an apparatus for protecting a network service device is disclosed. The apparatus may comprise memory comprising programmed instructions stored in the memory and one or more processors configured to be capable of executing the programmed instructions stored in the memory to: activate a timer for a predetermined time period, during the activation of the timer, receive a first request to establish a connection with the network service device and determine whether the first request originated from a legitimate source. In response to the determination that the first request originated from the legitimate source, the one or more processors may further add the legitimate source to a trust list comprising one or more trusted sources. After expiration of the timer, the one or more processors may further receive a data packet to be transmitted to the network service device and determine whether the data packet originated from any of the trusted sources in the trust list. In response to the determination that the data packet did not originate from any of the trusted sources in the trust list, the one or more processors may further restrict a transmission of the data packet to the network service device.

According to another aspect of the disclosure, a non-transitory computer readable medium is disclosed. The non-transitory computer readable medium may have stored thereon instructions for protecting a network service device, comprising executable code which when executed by one or more processors, causes the one or more processors to activate a timer for a predetermined time period. The executable code may further cause the one or more processors to during the activation of the timer, receive a first request to establish a connection with the network service device and determine whether the first request originated from a legitimate source, and in response to the determination that the first request originated from the legitimate source, add the legitimate source to a trust list comprising one or more trusted sources. After expiration of the timer, the executable code may further cause the one or more processors to receive a data packet to be transmitted to the network service device and determine whether the data packet originated from any of the trusted sources in the trust list. In response to the determination that the data packet did not originate from any of the trusted sources in the trust list, the one or more processors may further restrict a transmission of the data packet to the network service device.

According to another aspect of the disclosure, a network traffic management system comprising one or more traffic management apparatuses, server devices, or client devices is disclosed. The network traffic management system may comprise memory comprising programmed instructions stored thereon and one or more processors configured to be capable of executing the stored programmed instructions to: activate a timer for a predetermined time period. During the activation of the timer, the one or more processors may further receive a first request to establish a connection with the network service device and determine whether the first request originated from a legitimate source. In response to the determination that the first request originated from the legitimate source, the one or more processors may further add the legitimate source to a trust list, the trust list comprising one or more trusted sources. After expiration of the timer, the one or more processors may further receive a data packet to be transmitted to the network service device and determine whether the data packet originated from any of the trusted sources in the trust list. In response to the determination that the data packet did not originate from any of the trusted sources in the trust list, the one or more processors may further restrict a transmission of the data packet to the network service device.

With implementations of the above and operations that will be discussed below, scenarios wherein a network service receives a suspicious data packet not originated from a trust source may be alleviated. Accordingly, protections of the network service device may be improved and enhanced. Additionally, more fraudulent or non-legitimate data packets may be identified and therefore transmissions of such suspicious data packet may be restricted. Therefore, potential attacks to a protected network service device may be mitigated.

The above and other aspects and their implementations are described in greater detail in the drawings, the descriptions, and the claims below.

BRIEF DESCRIPTION OF THE DRAWINGS

The foregoing and other aspects of the present disclosure are best understood from the following detailed description when read in connection with the accompanying drawings. For the purpose of illustrating this technology, specific examples are shown in the drawings, it being understood, however, that the examples of this technology are not limited to the specific instrumentalities disclosed. Included in the drawings are the following Figures:

FIG. 4 illustrates a flow diagram of an exemplary method for protecting a network service device being executed at a network traffic management apparatus.

DETAILED DESCRIPTION

Figure 1:
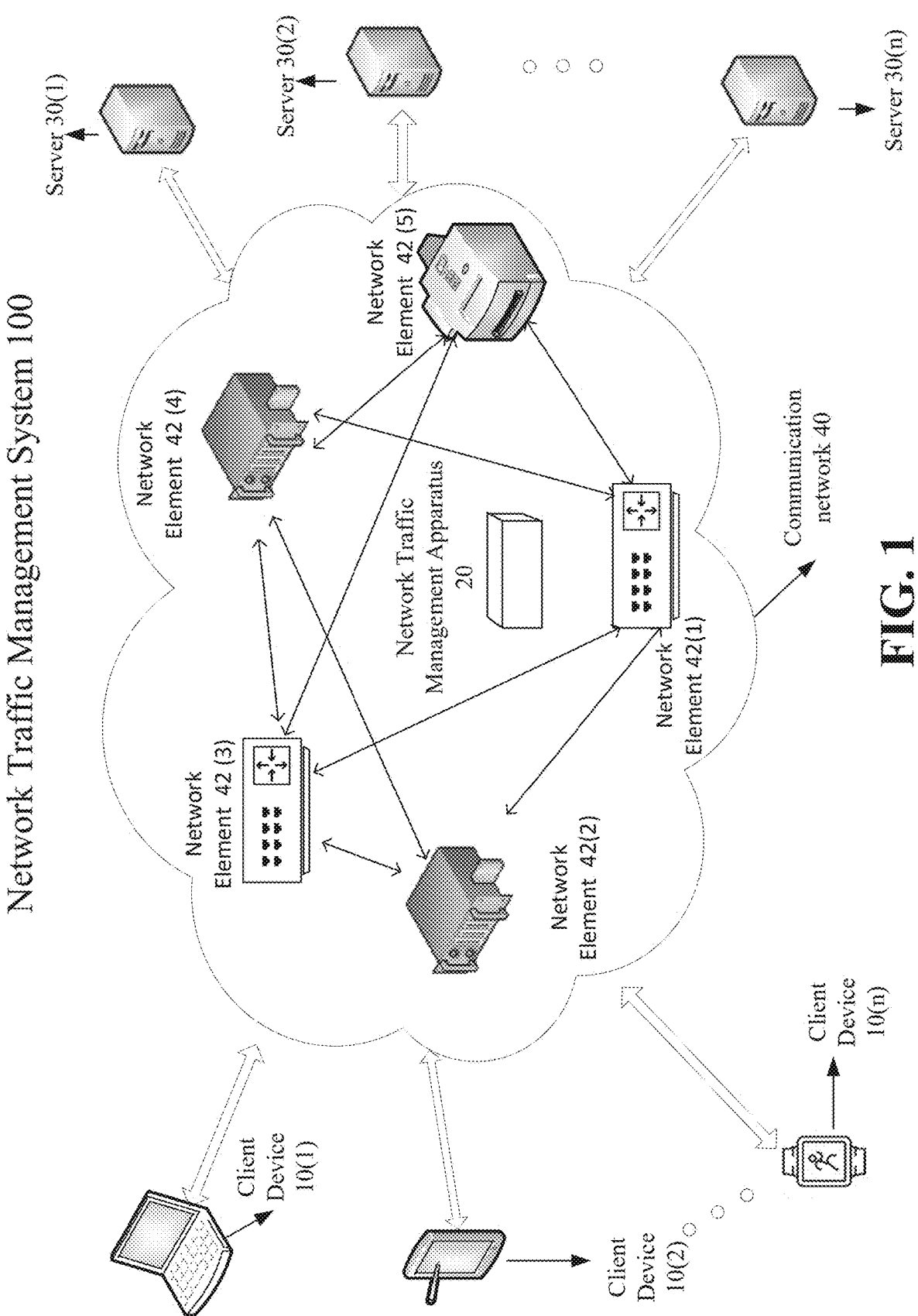
FIG. 1 illustrates an exemplary network traffic management system.

The present disclosure may be understood more readily by reference to the following detailed description of exemplary examples. Before the exemplary implementations and examples of the methods, devices, and systems according to the present disclosure are disclosed and described, it is to be understood that implementations are not limited to those described within this disclosure. Numerous modifications and variations therein will be apparent to those skilled in the art and remain within the scope of the disclosure. It is also to be understood that the terminology used herein is for describing specific implementations only and is not intended to be limiting. Some implementations of the disclosed technology will be described more fully hereinafter with reference to the accompanying drawings. This disclosed technology may, however, be embodied in many different forms and should not be construed as limited to the implementations set forth therein.

In the following description, numerous specific details are set forth. But it is to be understood that examples of the disclosed technology may be practiced without these specific details. In other instances, well-known components, structures, and techniques have not been shown in detail in order not to obscure an understanding of this description. References to "an implementation," "an example," "some examples," etc., indicate that the implementation(s) of the disclosed technology so described may include a particular feature, structure, or characteristic, but not every implementation necessarily includes the particular feature, structure, or characteristic. Further, repeated use of the phrase "in some examples" does not necessarily refer to the same implementation, although it may. Additionally, it is to be understood that particular features, structures, or characteristics that described in different examples, implementations or the like, may be further combined in various ways and being implemented in one or more implementations.

A network traffic management system may relate to a set of tools, processes, devices, and relevant technologies to control and optimize data flow within a computer network. Such network traffic management system may monitor, analyze, control and balance network traffic to maintain the performance and reliability of a computer network. A network traffic management system may be implemented in various network topologies. Devices utilized and topologies designed in a network environment may depend on specific requirements and a scale of a network. Factors may include such as the size of the network, its geographic spread, the types of applications and services being offered, the organization's traffic management requirements, etc. For example, the network traffic management system may be implemented in a centralized, distributed, or cloud-based topology in various networks. The network traffic management system may be executed in various networks, include but not limited to, Local Area Networks (LAN), Wide Area Networks (WAN), Metropolitan Area Network (MAN), data center networks, cloud networks, hybrid networks, or any appropriate existing networks or the ones that may be developed in the future. Various devices may be involved in the network traffic management system, depending on the specific network and topology being used. For example, edge routers or switches, firewalls, proxies, load balancers, Content Delivery Network (CDN) servers, application servers, etc. may be included in a network traffic management system.

A network traffic management apparatus may refer to an apparatus executing one or more operations as will be described below to protect a network service device according to various examples of this disclosure. The network traffic management apparatus may reside at any network devices or components that has an ability to intercept, analyze and process a data packet transmitted from a client device to a network service device (e.g., a router, a switch, a Smart Network Interface Card (Smart NIC), etc.), reside at any network device or components communicatively connected thereto, or reside at any appropriate device to implement the operation(s) in this disclosure. Such network traffic management apparatus may enhance a security protection for the network service device by implementing the one or more operations described in this disclosure.

A network service device may be any network device that provides a service to a user device, which is designated as an end point to be protected by the network traffic management apparatus. The network service device may be implemented in various ways, such as hardware, software, firmware, or any combination thereof. For example, the network service device to be protected may be a server of the network traffic management system (e.g., a web application server, such as one of the servers 30(1)-30(n) illustrated in FIG. 1 which will be described in the following), or a virtual machine, virtual server, container, engine, instance or the like that resides at a server or other network elements.

A user device, from where traffic to a network service device that being protected by the network traffic management apparatus in this disclosure, may refer to any user device that may send or initiate a request to the network service device to establish or continue to a communicative connection with the network service device. Similar as the network service device, the user device may be implemented in various ways, including but not limited to, hardware, software, firmware, or any combination thereof.

FIG. 1 illustrates an exemplary simplified network traffic management system 100 according to an example of this disclosure. As illustrated in FIG. 1, the network traffic management system 100 may comprise a plurality of client devices 10(1)-10($n$), a communication network 40, and a plurality of servers 30(1)-30($n$) serving the client devices 10(1)-10($n$). The client devices 10(1)-10($n$) and servers 30(1)-30($n$) may communicatively connect with each other via the communication network 40.

Referring to FIG. 1, as an exemplary implementation of the user device discussed above, one of the client devices 10(1)-10($n$) may send a request to one of the servers 30(1)-30($n$) for a service (e.g., via a web browser installed at one of the client devices 10(1)-10($n$). The client devices 10(1)-10($n$) may also be referred to as a "client," "user equipment," or "user equipment device," which may include but is not limited to a mobile phone, smartphone, tablet, laptop computer, a smart electronics, a wearable device, a video surveillance device, an industrial wireless sensors, or an appliance including an air conditioner, a television, a refrigerator, an oven and the like, or other devices that are capable of communicating wirelessly over a network. Moreover, one or more of the client devices 10(1)-10($n$) may also be a proxy or a server or any network elements or devices, which may send above discussed request to the one of the servers 30(1)-30($n$) on behalf of a user equipment. For example, one or more of the client devices 10(1)-10($n$) may be a proxy (e.g., a forward proxy) of a private network, which forwards a request message that it received from a client device isolated within the private network. In this way, the proxy sends a request message on behalf of the isolated device and allows it to be served by one of the servers 30(1)-30($n$). In this scenario, the proxy plays the role of one of the client devices 10(1)-10($n$) in the network traffic management system 100 as illustrated in FIG. 1.

Continuing to refer to FIG. 1, as an exemplary implementation of the network service device discussed above, the one of the servers 30(1)-30($n$) may respond to one of the client devices 10(1)-10($n$) and have one or more interactions with one of the client devices 10(1)-10($n$) to provide the requested service or data, in response to receiving the request from one of the client devices 10(1)-10($n$) via the communication network 40. The servers 30(1)-($n$) may be any types of servers to serve a client device. For example, the servers 30(1)-($n$) may be application servers that run applications, manage, and execute various tasks related to the processing of user device's requests within the network environment. Various services may be provided by the servers 30(1)-($n$).

As illustrated in FIG. 1, the communication network 40 may comprise a plurality of network elements 42(1)-42($n$) to provide connectivity and data transmission. Depending on the topology and features of the communication network 40, there may be various types of network elements 42(1)-42($n$) (e.g., a router, a proxy, a load balancer, etc.) to perform designated functionalities. As illustrated in FIG. 1, one of the client devices 10(1)-10($n$) may communicatively connected to the communication network 40. When one of the client devices 10(1)-10($n$) sends a message to request a service provided by one of the servers 30(1)-30($n$), the message may go through some of the network elements 42(1)-42($n$) before reaching its destination. It is to be understood that different network technologies may be applied by the communication network 40. For example, communication network 40 may be one or more wired or wireless public or private networks, based on any industry-standard protocols, such as Ethernet, Wi-Fi, Satellite Networks, 4G/LTE (Long-Term Evolution), 5G, and various internet protocols like TCP/IP. The communication network 40 may also be formed by connecting appropriate number of networks together as needed.

In the network environment illustrated in FIG. 1, to protect the servers 30(1)-30($n$) from an attack or for purpose of anti-fraud (e.g., anti-bot), some protection mechanisms may be designed to execute on the servers 30(1)-30($n$) itself or some device(s) that communicatively connected to the servers 30(1)-30($n$) (e.g., an intermediate device sitting between one of the client device(s) 10(1)-10($n$) and one of the servers 30(1)-30($n$), such as a router, a load balancer, etc.). When executing, the protection mechanisms may intercept traffic and drop certain suspicious data as needed to protect one of the servers 30(1)-30($n$) and avoid potential attack(s) to one of the servers 30(1)-30($n$). With the emergence of various forms of network attacks, effective protection mechanisms are expected to design corresponding countermeasures to mitigate attacks. As an example, IP spoofing is a common way for bad or malicious users to invoke a DDoS attack against a target server. Malicious users create data packets with modified and therefore forged source IP address, with a goal of overwhelming a target server with traffic while masking the identity of the malicious source and preventing mitigation efforts. Therefore, it could be important for protection mechanisms or solutions to differentiate malicious or bad traffic from valid ones. This is not easy because an intercepted data packet may have very limited information to make such differentiation. For example, among TCP traffic, data packet such as SYN, ACK, and PSH packets have little contextual information. Moreover, due to complexities such as a variety of different rules set under different communication protocols applied by different network architectures, countermeasures are often designed for and therefore specific to particular execution and application environments. For example, in symmetric routing mode, because the visibility of traffic between one of the client devices 10(1)-10($n$) and one of the servers 30(1)-30($n$) in both directions, specific message flow can be designed for confirming the legitimacy before establishing a connection therebetween (e.g., a message flow comprising SYN request, ACK and SYN response, and ACK response to negotiate sync cookies such as sequence and ACK numbers). However, this manner may be not applicable to an asymmetric mode because a proxy device site between one of the client devices 10(1)-10($n$) and one of the servers 30(1)-30($n$) cannot see traffic in both directions therebetween (e.g., can only inspect traffic transmitted from one of the client devices 10(1)-10($n$) to one of the servers 30(1)-30($n$)). As another example, the traffic flow may be synchronous or asynchronous data packets resulting in one protection mechanism may be not applicable to both scenarios, or some protection mechanism may only apply to data packets of a new connection but not data packets for ongoing or already established connections. Therefore, an improved protection mechanism is desired.

Referring to FIG. 1, by implementing the network traffic management apparatus 20 described in this disclosure at any appropriate device or component that sits between a client device and a network service device to be protected along a network communication connection established or to be established therebetween, or any device or component that communicatively connected thereto (e.g., reside at an intermediate device such as a router or a load balancer between the one of the client devices 10(1)-10(n) and one of the servers 30(1)-30(n)), undesired scenarios described above at least may be alleviated to a certain extent. Such network traffic management 20 may be executed to implement one or more operations which will be discussed below, to protect a network service device which is an endpoint providing certain service(s) or data to various client devices.

It is to be understood that FIG. 1 illustrates an exemplary simplified network traffic management system 100 to which many variations may be made. For example, other types and numbers of systems, devices, components, and elements in other topologies may be used to add into the illustrated system or replace any part of the illustrated system. Furthermore, one or more of the components depicted in the network traffic management system 100, such as the network traffic management apparatus 20, may be configured to operate as virtual instances on the same or different physical machine(s). In some scenarios, the network traffic management apparatus 20 may operate as more than one separate devices at different physical devices, and communicatively connected with each other through communication network 40 or other relevant network(s) as needed, rather than operate on the same physical device as illustrated in FIG. 1.

Figure 2:
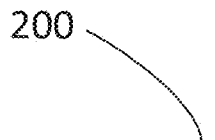
FIG. 2 illustrates an exemplary execution environment of a network traffic management apparatus.
Figure 2:
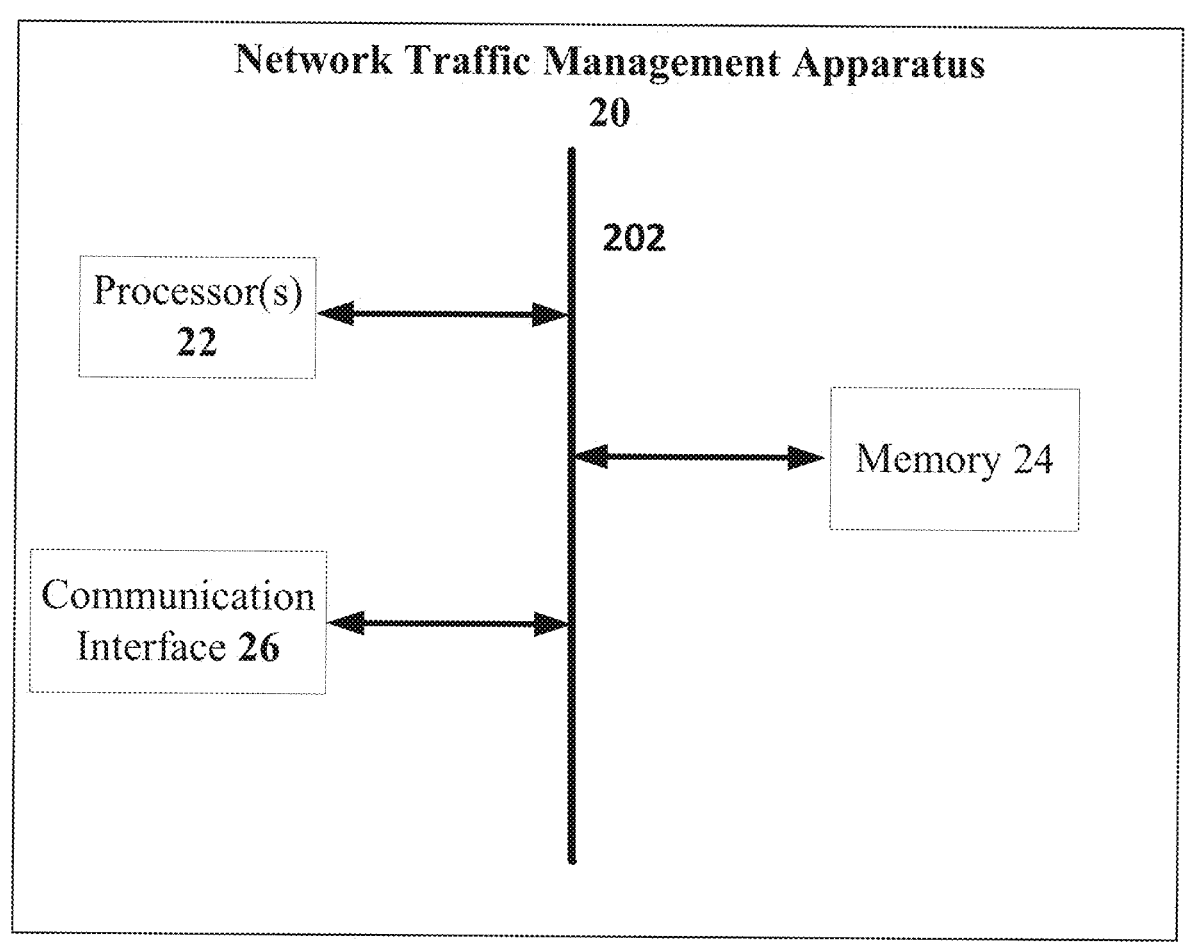

FIG. 2 shows an exemplary execution environment 200 of the network traffic management apparatus 20. In the execution environment 200, the network traffic management apparatus 20 may include processor(s) 22, a memory 24, a communication interface 26 and/or other circuitries, which are coupled together by a bus 202 or other communication link. It is to be understood that the network traffic management apparatus 20 may include other types and/or numbers of elements in other configurations. The processor(s) 22 of the network traffic management apparatus 20 may execute programmed instructions stored in the memory 24 of the network traffic management apparatus 20 for any number of the operations or tasks identified in this disclosure. The processor(s) 22 of the network traffic management apparatus 20 may include one or more central processing units (CPU) or general-purpose processors with one or more processing cores, for example, although other types of processor(s) can also be used. The communication interfaces 26, which may support wireless, e.g., Bluetooth, Wi-Fi, WLAN, cellular (4G, LTE/A, 5G), and/or wired, Ethernet, Gigabit Ethernet, optical networking protocols. The communication interfaces 26 may also include serial interfaces, such as universal serial bus (USB), serial ATA, IEEE 1394, lighting port, I2C, slimBus, or other serial interfaces. In some examples, the execution environment 200 may further include power functions and various input interfaces (not shown in FIG. 2). In some examples, the execution environment 200 may further include a user interface that may include human-to-machine interface devices and/or graphical user interfaces (GUI).

The memory 24 of the network traffic management apparatus 20 may store these programmed non-transitory computer-readable instructions for one or more aspects of the technology as described and illustrated herein, although some or all of the programmed instructions could be stored elsewhere. A variety of different types of memory storage devices, such as random access memory (RAM), read only memory (ROM), Hard Disk Drive (HDD), solid state drives, flash memory, Erasable Programmable Read Only Memory (EPROM), or other computer readable medium such as magnetic or optical disc (e.g., Compact Disc Read Only Memory (CD-ROM)) which is read from and written to by a magnetic, optical, or other machine-readable medium that is coupled to the processor(s) 22, may be used as the memory 24. Accordingly, the memory 24 of the network traffic management apparatus 20 may store application(s) that can include computer executable instructions that, when executed by the network traffic management apparatus 20, cause the network traffic management apparatus 20 to perform actions or operations, such as to transmit, receive, or otherwise process messages, for example, and to perform other actions or operations described and illustrated below with reference to the drawings. An application may be implemented as a unit, module, component, instance, or engine of other applications and/or operating system extensions, plugins, or the like. The application(s) can be executed within or as virtual machine(s) or virtual server(s) that may be managed in a cloud-based computing environment, without being tied to one or more specific physical network devices.

The methods, devices, processing, circuitry, and logic described below may be implemented in many different ways and in many different combinations of hardware, software, firmware, or combination thereof. For example, all or parts of the implementations may be circuitry that includes an instruction processor, such as a Central Processing Unit (CPU), microcontroller, or a microprocessor; or as an Application Specific Integrated Circuit (ASIC), Programmable Logic Device (PLD), or Field Programmable Gate Array (FPGA); or as circuitry that includes discrete logic or other circuit components, including analog circuit components, digital circuit components or both; or any combination thereof. The circuitry may include discrete interconnected hardware components or may be combined on a single integrated circuit die, distributed among multiple integrated circuit dies, or implemented in a Multiple Chip Module (MCM) of multiple integrated circuit dies in a common package, as examples.

Accordingly, the circuitry may store or access instructions for execution, or may implement its functionality in hardware alone. The instructions may be stored in a tangible storage medium (e.g., memory 24) that is other than a transitory signal. A product, such as a computer program product, may include a storage medium and instructions stored in or on the medium, and the instructions when executed by the circuitry in a device may cause the device to implement any of the processing described above or illustrated in the drawings.

The implementations discussed herein may be distributed. For instance, the circuitry may include multiple distinct system components, such as multiple processors and memories, and may span multiple distributed processing systems. Parameters, databases, and other data structures may be separately stored and managed, may be incorporated into a single memory or database, may be logically and physically organized in many different ways, and may be implemented in many different ways. Example implementations include linked lists, program variables, hash tables, arrays, records (e.g., database records), objects, and implicit storage mechanisms. Instructions may form parts (e.g., subroutines or other code sections) of a single program, may form multiple separate programs, may be distributed across multiple memories and processors, and may be implemented in many different ways. Example implementations include standalone programs, and as part of a library, such as a shared library like a Dynamic Link Library (DLL). The library, for example, may contain shared data and one or more shared programs that include instructions that perform any of the processing described above or illustrated in the drawings, when executed by the circuitry.

Figure 3:
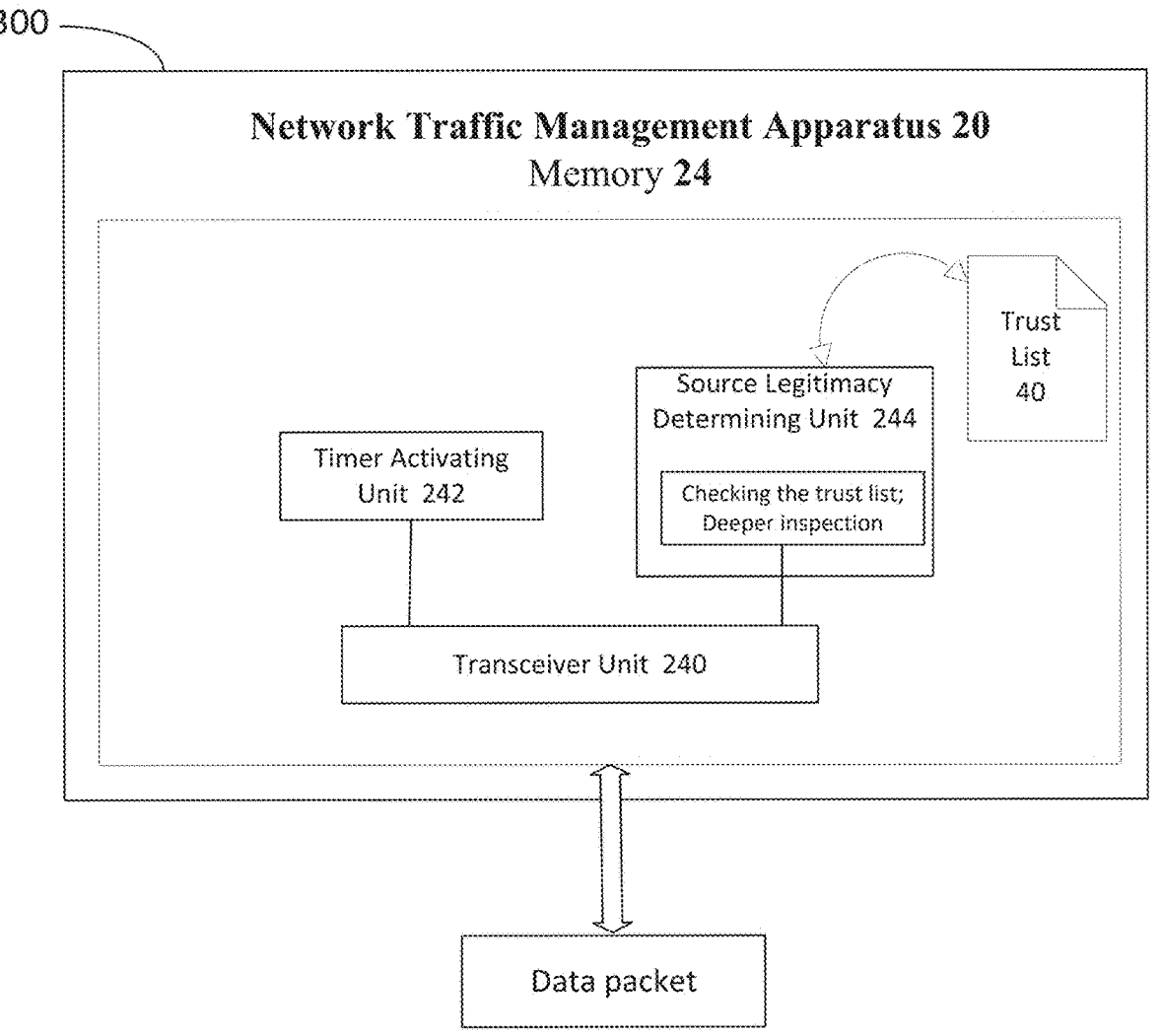
FIG. 3 illustrates an exemplary block diagram of a network traffic management apparatus.

Referring to FIG. 3, an exemplary block diagram of the network traffic management apparatus 20 to protect a network service device is illustrated. In FIG. 3, the network traffic management apparatus 20 may comprise Transceiver Unit 240, Timer Activating Unit 242, and Source Legitimacy Determining Unit 244. Operations performed by those units will be described in conjunction with the flow diagram illustrated in FIG. 4. Those units described herein may be implemented with various available or appropriate programing APIs, such as JavaScript, Python, etc.

The term "unit" (and other similar terms such as module, submodule, etc.) may refer to computing software, firmware, hardware, and/or various combinations thereof. At a minimum, however, units are not to be interpreted as software that is not implemented on hardware, firmware, or recorded on a non-transitory processor readable recordable storage medium. Indeed, "unit" is to be interpreted to include at least some physical, non-transitory hardware such as a part of a processor, circuitry, or computer. Two different units may share the same physical hardware (e.g., two different units can use the same processor and network interface). The units described herein can be combined, integrated, separated, and/or duplicated to support various applications. Also, a function described herein as being performed at a particular unit can be performed at one or more other units and/or by one or more other devices instead of or in addition to the function performed at the particular unit. Further, the units can be implemented across multiple devices and/or other components local or remote to one another. Additionally, the units can be moved from one device and added to another device, and/or can be included in both devices. The units can be implemented in software stored in memory or non-transitory computer-readable medium. The software stored in the memory or medium can run on a processor or circuitry (e.g., ASIC, PLA, DSP, FPGA, or any other integrated circuit) capable of executing computer instructions or computer code. The units can also be implemented in hardware using processors or circuitry on the same or different integrated circuit.

FIG. 4 illustrates a flow diagram of an exemplary process 400 for protecting a network service device implemented or executed by the network traffic management apparatus 20. As discussed above, the network traffic management apparatus 20 may reside at and be implemented on any appropriate device(s). The device(s) itself may be involved in a communicative connection between a user device (e.g., one of the client devices 10(1)-10(n)) and the protected network service device (e.g., one of the servers 30(1)-30(n)). Alternatively, the device(s) may communicatively connect a device involved in the communicative connection mentioned herein. Also, the network traffic management device 20 may be distributed on different devices in the network. In the following, steps illustrated in FIG. 4 will be described in conjunction with the logic of the network traffic management apparatus 20 shown in FIG. 3.

At step 401, the Timer Activating Unit 242 of the network traffic management apparatus 20 may activate a timer for a predetermined time period. The activation of the timer may be performed as a response to a plurality of different scenarios. In some examples, step 401 is performed, and the timer is activated in response to receiving a notification indicating there is an attack risk to a protected network service device 30. For example, this may happen during a switchover from DSR to non-DSR mode in an ADOS scenario. The notification may be received via the Transceiver Unit 240 of the network traffic management apparatus 20. In some other examples, step 401 is performed, and the timer is activated at predetermined timing (e.g., fixed periodic time such as midnight every day which may be utilized in such as NX (non-existent) Domain protection list). In some further examples, step 401 is performed, and the timer is activated as a response to identifying a new legitimate source, a scenario similar to step 403, which will be described in more details below.

The timer may be dynamically configurable, which may by way of example be a few minutes. In some further examples, the timer may be infinite and can be cleared in response to an ending instruction (e.g., configured to be generated based predetermined events or time, or by a manual instruction input by a user). It is to be understood that a protection mechanism may in some examples always be executed and in other may not always be constantly executed and instead may be executed when needed. For example, a protection mechanism may be enabled and executed when need, such as in response to detecting an attack (e.g., a SYN attack) risk. In another example, take a DDoS mitigation device as a non-limiting example, such a device may be configured in an Always-on mode and being executed all the time to constantly protect a server. Alternatively, such DDoS mitigation device may be configured in an On-demand mode and only executed to protect a server under a risk of DDoS attack or severe security threat. The operations discussed in the examples in this disclosure are applicable to these and other scenarios, and the timer may be activated or triggered by a detection of an attack risk. A detection of an attack may be performed by the network traffic management apparatus 20 itself, or by any other device(s) or platform(s) within the system. Then a risk of a detected attack may be evaluated or determined by the network traffic management apparatus 20 or other device(s) within the system. In some examples, the notification may be a predetermined instruction signal to notify or indicate the existence of an attack risk and activate the timer. An existence of an attack risk may be determined based on a predetermined attack threshold, which may be set for example based on some metrics (e.g., certain percentage of leak value, or parameters about the server's normal ability and traffic pattern). The activation of the timer indicates a start of a learning time period after the system receives a notice of an attack risk, which will be described below.

At step 402, the Source Legitimacy Determining Unit 244 of the network traffic management apparatus 20 may receive a first request to establish a connection with one of the servers 30(1)-30(n) during the activation of the timer. The Source Legitimacy Determining Unit 244 may determine whether the first request originated from a legitimate source. If the Source Legitimacy Determining Unit 244 determines the first request not originated from a legitimate source, it may wait for receiving a next first request. If the Source Legitimacy Determining Unit 244 determines the first request originated from a legitimate source, the exemplary process 400 proceeds to step 403.

At step 403, in response to a determination that the first request originated from the legitimate source, the Source Legitimacy Determining Unit 244 may add the legitimate source to a trust list 40, wherein a trust list 40 may comprise one or more trusted sources. In some examples, a legitimate source may be identified with an IP Address, i.e., a source IP Address. In some other examples, a legitimate source may be identified with other marking manner (e.g., DNS domain name). During the running time period of the timer, it may be considered as a learning time or window to build the trust list 40. During such time period, for any data packet requesting establishing a connection with one of the servers 30(1)-30(*n*) (e.g., a TCP SYN packet), the legitimacy of its source may be checked by the Source Legitimacy Determining Unit 244.

The Source Legitimacy Determining Unit 244 may employ a challenge and response mechanism to determine the legitimacy of the first request. Specifically, in this example the Source Legitimacy Determining Unit 244 may transmit a response to a source where the first request originated from. The response may comprise an identifier for the requested connection. Then if the Source Legitimacy Determining Unit 244 receives a request from the source requesting a reset of the requested connection, the source may be determined as a legitimate source. As discussed above, if the source is not a legitimate one (e.g., the packet has been spoofed and the source address is forged), such malicious source will not respond to the Source Legitimacy Determining Unit 244 at all and therefore will not transmit a connection reset request. In some examples, the identifier may be configured as an identifier causing a legitimate source to respond with a connection reset request. In some examples, the identifier may comprise incorrect or wrong information (e.g., an ACK response to a SYN packet, with a wrong or bad sequence number). In this case, a legitimate source would try to create a new connection after detecting the incorrect sequence number.

At step 404, after expiration of the timer, the Source Legitimacy Determining Unit 244 of the network traffic management apparatus 20 may receive a data packet which is sent from one of the client devices 10(1)-10(*n*) to one of the servers 30(1)-30(*n*) and determine whether the data packet originated from any of the trusted sources in the trust list 40. The expiration of the timer is the end of the learning time period discussed above. In other words, when facing an attack risk, after the expiration of the timer an attacking mitigation is executed. Accordingly, with the attack mitigation, all of the data packets may be intercepted and compared (e.g., with "read" operation) against a list of trusted sources in the trust list 40. The data packets that are determined to originate from sources on the trust list, those data packets may be considered as being transmitted from legitimate sources. Therefore, such data packets may be continued to be transmitted to the designated one of the servers 30(1)-30(*n*). Such data packets may be, for example, a new connection request sent from a trusted source, or traffic relating to an ongoing connection, which has already been established. It is to be understood that during the activation of the timer and after the expiration of the timer, the transceiver unit 240 of the network traffic management apparatus 20 may receive a data packet requesting a new connection with one of the servers 30(1)-30(*n*). To differentiate new connection requests received during the activation of the timer and after the expiration of the timer, the former is referred to as first requests and the latter is referred to as second requests in this disclosure. As discussed above, the trust list 40 is established based on checking the legitimacy of sources of the first requests. The determination made at step 404 relying on the established trust list provides an effective mechanism to process received data packets.

At step 405, in response to the determination that any of the data packets did not originate from any of the trusted sources in the trust list 40, the Source Legitimacy Determining Unit 244 of the network traffic management apparatus 20 may restrict a further transmission of any such data packets to one of the servers 30(1)-30(*n*). At this time point, an attack mitigation begins to have a real impact on the data packets transmitted within the system, after the learning time period discussed above. For example, the Source Legitimacy Determining Unit 244 may discard (e.g., drop TCP PSH or ACK packet) such data packet directly. It is to be understood that dropping this data packet may result in a refusal of a new connection request, if the data packet is requesting a new connection, or in another example may disrupt an existing connection if the data packet is for an already established connection. In other words, all the data packets which are transmitted from sources not listed in the trust list 40 are treated as suspicious and an aggressive mitigation action which can impact the establishment or continuation of a connection is executed.

Alternatively, in some examples, less disruptive manners may be employed by the Source Legitimacy Determining Unit 244. For example, before further transmission of such a potentially compromised data packet to the one of the servers 30(1)-30(*n*), the Source Legitimacy Determining Unit 244 may cause a further inspection (i.e., a deeper inspection) on the data packet either by itself, the network traffic management apparatus 20, or any other appropriate network component or device. In other examples, the Source Legitimacy Determining Unit 244 may still transmit such data packet but may reduce its transmission priority which may slow down the transmission. It is to be understood that how disruptive a mitigation activation is employed may depend on a detected attack risk. For example, among the data packets received after the expiration of the timer, if a high fraction of data packets is transmitted from trusted sources of the trust list 40, a less disruptive manner may be considered and employed by the Source Legitimacy Determining Unit 244. However, if there are a significant amount of data packets not transmitted from trusted sources, then a more disruptive manner such as discarding may be employed.

In some examples, reducing the transmission priority may comprise setting a transmission data upper limit (e.g., number of packets allowed to be transmitted per second) on the transmission of a data packet which has not originated from a trusted source in the trust list 40. The transmission data upper limit may be configured based on a plurality of metrics, such as a preexisting profile of expected traffic by way of example only. In some examples, there may be legitimate long-lasting connections which were established and therefore existed before the activation of the timer. Therefore, there is no chance to add its legitimate source to the trust list 40 if the same source did not send any new connection request during the activation of the timer. By way of example, a health check monitor is one of such long-lasting connections, which may last for one or multiple days to check a status of a connection. For this type of connections, the Source Legitimacy Determining Unit 244 may continue to transmit relevant data packets for such connections, at a rate no higher than the configured transmission data upper limit. In some examples, the Source Legitimacy Determining Unit 244 allows long-lasting connections to continue if the connections consume low bandwidth but discard or arrange further inspection for the connections consuming higher bandwidth (e.g., higher than a predetermined threshold). Therefore, the less disruptive manners or the transmission data upper limit may be a balance between allowing potentially legitimate data packets to be transmitted and potential disrupting the one of the servers 30(1)-30(*n*).

In some examples, the transmission data upper limit may be configured dynamically, based on a plurality of factors.

One factor may be an elapsed period of time after a switchover from the server to a device. In a non-limiting example, the switchover is a DDoS switchover wherein traffic on a regular path between client device 10 and one of the servers 30(1)-30(n) is redirected when an attack risk or an attack is detected. It is to be understood that the longer time elapsed from the switch over, the lower the transmission data upper limit may be set. In other words, the longer the more traffic being blocked. Another factor may be a ratio of a number of data packets originated from trusted source in the trust list 40 to a number of data packets not originated from any trusted sources in the trust list 40. In other words, it is a ratio of good or trusted packets to bad packets. This ratio may indicate how serious a potential or ongoing attack is, and also reflect the fraction or proportion of bad data packets among all of the data packets being intercepted. As another example, a factor may be a ratio of a number of data packets requesting a new connection to a number of data packets of existing connections. It is to be understood that among the data packets received after the expiration of the timer, some data packets may request for establishing a new connection with one of the servers 30(1)-30(n), while the other data packets may relate to traffic of established connections. Herein, the ratio indicates a ratio of the number of those two types of data packets (i.e., the number of data packets to initiate a connection versus the number of non-connection request packets). It is to be understood that the transmission data upper limit may be determined by the Source Legitimacy Determining Unit 244 based on any one of those factors, or any combination of them.

In some examples, for a data packet that received after the expiration of the timer which is not originated from any trusted source of the trust list 40, the Source Legitimacy Determining Unit 244 may further determine the legitimacy of its source, i.e., a deeper inspection described above. This may happen, for example, in Syn Cookie Whitelist scenario. In some examples, the Source Legitimacy Determining Unit 244 may perform such determination only for a data packet received after the expiration of the timer which requests a new connection (i.e., the second request mentioned above). Herein, the Source Legitimacy Determining Unit 244 may perform the determination in a manner similar to step 402. Then if it is determined that such data packet not originated from a legitimate source, the Source Legitimacy Determining Unit 244 may restrict in a manner similar to that previously described in step 405. Otherwise, if the Source Legitimacy Determining Unit 244 determines that the data packet requesting a new connection originated from another legitimate source not included in the trust list 40, the Source Legitimacy Determining Unit 244 may add (e.g., with "write" operation) this another legitimate source to the trust list 40. In this scenario, an activation of the timer may be triggered, and the timer may run for a certain period of time to add any additional new legitimate source(s) to the exiting trust list. In other examples, identifying a legitimate source from where a packet is received may be a separate event to trigger the activation of the timer and implementation of step 401 and therefore the process 400. In other words, to trigger step 401, such identification of a legitimate source may be an independent event where no timer has been triggered and no trust list has been established. Then follow this event, steps 401-403, or steps 401-405 discussed in this disclosure may be performed.

It is to be understood that at the first time that process 400 being implemented by the network traffic management apparatus 20 (i.e., when the timer is activated in step 401), the trust list 40 may be blank or empty. In some other examples, the trust list may be an existing one which may be updated or revised with time. For example, the trust list 40 may already comprise some trusted sources that have been added or marked by other devices or systems. In some examples, a trust list may be cleared in response to a notification that the indicated attack risk does not exist anymore. In some other examples, a trust list may be cleared in response to another activation of a timer and therefore a completely new trust list may be established in another process 400. In some examples, the entries created in the trust list during the process 400 do not expire. In some other examples, an entry created in the trust list may have a predetermined lifetime. For example, an entry may be configured to expire after a predetermined but configurable duration (e.g., one hour) after being created and added to the trust list or after the most recent time at which a packet originated from a source identified by this entry was seen. It is also understandable that the process 400 may be implemented by the network traffic management apparatus 20 repeatedly. This means the trust list 40 may be more and more complete over time. Moreover, it is to be understood that such trust list 40 may be shared among more than one network traffic management apparatus 20 or other network component or devices. With implementations of all or part of the above discussed operations for protecting a network service device by a network traffic management apparatus, a protection solution may be applied to all data packets by introducing the learning time period and restrictions imposed when a data packet not originated from a trusted source in a trust list. During the learning time period, a trust list may be built before any attacking mitigation being executed. Rather than being executed immediately after noticing an attack risk, an attacking mitigation in this disclosure is delayed by such learning time. Such learning time period allows continued transmissions of data packets of existing connections which may be legitimate but have no chance to be added to the trust list because they are established before the activation of the timer (i.e., the building of the trust list). In this way, a risk of false positive, i.e., aggressive and mistakenly discarding and therefore disrupting legitimate traffic (e.g., in asymmetric routing mode such as Dynamic source routing (DSR)) may be reduced. Furthermore, instead of discarding directly, the reduced transmission priority (e.g., rate limitation introduced by the transmission rate upper limit) further provides a solution for pre-established long-lived connections (e.g., low bandwidth connections) to continue to naturally terminate without a disruption, meanwhile protecting a network service device from overwhelming. This further reduce a possibility of affecting existing legitimate traffic. In addition, the protection solution proposed in this disclosure has a light weight without keeping a flow table state, which also reduces required resources such as memory footprint.

Throughout the specification and claims, terms may have nuanced meanings suggested or implied in context beyond an explicitly stated meaning. It will be further understood that: the term "or" may be inclusive or exclusive unless expressly stated otherwise; the term "set" may comprise zero, one, or two or more elements; the terms "some", "another," and "particular" are used as naming conventions to distinguish elements from each other and does not imply an ordering, timing, or any characteristic of the referenced items unless otherwise specified; the terms "such as", "e.g.," "for example", and the like describe one or more examples but are not limited to the described examples(s); the term "comprises" and/or "comprising" specify the presence of stated features, but do not preclude the presence or addition of one or more other features.

Reference throughout this specification to features, advantages, or similar language does not imply that all of the features and advantages that may be realized be or are included in any single implementation thereof. Rather, language referring to the features and advantages is understood to mean that a specific feature, advantage, or characteristic described in connection with an example is included in at least one example of the present solution. Thus, discussions of the features and advantages, and similar language, throughout the specification may, but do not necessarily, refer to the same example.

Furthermore, the described features, advantages and characteristics of the present solution may be combined in any suitable manner in one or more implementations or examples. One of ordinary skill in the relevant art will recognize, in light of the description herein, that the present solution can be practiced without one or more of the specific features or advantages of a particular implementation or example. In other instances, additional features and advantages may be recognized in certain implementations or examples that may not be present in all implementations of the present disclosure.

What is claimed is:

1. A method for protecting a network service device, the method implemented by a network traffic management system comprising one or more network traffic management apparatuses, client devices, or server devices, the method comprising:

activating a timer for a predetermined time period;

during the activation of the timer, receiving a first request to establish a connection with the network service device and determining whether the first request originated from a legitimate source;

in response to determining that the first request originated from the legitimate source, adding the legitimate source to a trust list comprising one or more trusted sources;

after expiration of the timer, receiving a data packet to be transmitted to the network service device and determining a type of connection request associated with the data packet;

in response to the determining the type of connection request associated with the data packet is a new connection request, determining whether the data packet originated from any of the trusted sources in the trust list;

in response to the determining indicating that the data packet originated from at least one of the trusted sources in the trust list, transmitting the data packet to the network service device; and in response to the determining the type of connection request associated with the data packet is an established connection before the activation of the timer, transmitting the data packet to the network service device.

2. The method of claim 1, wherein the data packet comprises a second request to establish a connection with the network service device, the method further comprising:

in response to determining that the second request did not originate from any of the trusted sources in the trust list, determining whether another source the second request originated from is a legitimate source; and in response to determining that the another source is not a legitimate source, restricting a transmission of the second request to the network service device.

3. The method of claim 1, further comprising:

in response to determining that the data packet did not originate from any of the trusted sources in the trust list, restricting a transmission of the data packet to the network service device, wherein the restricting the transmission of the data packet to the network service device comprising at least one of:

discarding the received data packet;

performing a further inspection of the data packet before transmitting the data packet to the network service device; or reducing a transmission priority on the transmission of the data packet to the network service device.

4. The method of claim 3, wherein reducing the transmission priority comprises setting a transmission rate upper limit on the transmission of the data packet to the network service device based on at least one of the following:

an elapsed period of time after a switchover from the network service device to a backup network device;

a ratio of a number of new connection data packets to a number of existing connection data packets, the new connection data packets representing data packets for establishing a connection with the network service device within a set of the data packets received after the expiration of the timer, and the existing connection data packets representing data packets associated with the connection established before the activation of the timer within the set of the data packets; or a ratio of the number of data packet originated from any trusted sources in the trust list to the number of data packet not originated from any trusted sources in the trust list.

5. The method of claim 1, wherein the determining whether the first request originated from a legitimate source comprises:

transmitting a response comprising an identifier for the requested connection to a source the first request originated from; and in response to receiving a request to reset the requested connection from the source, determining that the first request originated from a legitimate source.

6. An apparatus for protecting a network service device, comprising memory comprising programmed instructions stored in the memory and one or more processors configured to execute the programmed instructions stored in the memory to:

activate a timer for a predetermined time period;

during the activation of the timer, receive a first request to establish a connection with the network service device and determine whether the first request originated from a legitimate source;

in response to determining that the first request originated from the legitimate source, add the legitimate source to a trust list comprising one or more trusted sources;

after expiration of the timer, receive a data packet to be transmitted to the network service device and determine a type of connection request associated with the data packet;

in response to the determining the type of connection request associated with the data packet is a new connection request, determine whether the data packet originated from any of the trusted sources in the trust list;

in response to the determining indicating that the data packet originated from at least one of the trusted sources in the trust list, transmit the data packet to the network service device; and in response to the determining the type of connection request associated with the data packet is an established connection before the activation of the timer, transmit the data packet to the network service device.

7. The apparatus of claim 6, wherein the data packet comprises a second request to establish a connection with the network service device, the one or more processors are further configured to, in response to determining that the second request did not originate from any of the trusted sources in the trust list, determine whether another source the second request originated from is a legitimate source; and in response to determining that the another source is not a legitimate source, restrict a transmission of the second request to the network service device.

8. The apparatus of claim 6, the one or more processors are further configured to:

in response to determining that the data packet did not originate from any of the trusted sources in the trust list, restrict a transmission of the data packet to the network service device, wherein the restricting the transmission of the data packet to the network service device comprising at least one of:

discarding the received data packet;

performing a further inspection of the data packet before transmitting the data packet to the network service device; or reducing a transmission priority on the transmission of the data packet to the network service device.

9. The apparatus of claim 8, wherein reducing the transmission priority comprises set a transmission rate upper limit on the transmission of the data packet to the network service device based on at least one of the following:

an elapsed period of time after a switchover from the network service device to a backup network device;

a ratio of a number of new connection data packets to a number of existing connection data packets, the new connection data packets representing data packets for establishing a connection with the network service device within a set of the data packets received after the expiration of the timer, and the existing connection data packets representing data packets associated with the connection established before the activation of the timer within the set of the data packets; or a ratio of the number of data packet originated from any trusted sources in the trust list to the number of data packet not originated from any trusted sources in the trust list.

10. The apparatus of claim 6, wherein the determining whether the first request originated from a legitimate source comprises:

transmitting a response comprising an identifier for the requested connection to a source the first request originated from; and in response to receiving a request to reset the requested connection from the source, determining that the first request originated from a legitimate source.

11. A non-transitory computer readable medium having stored thereon instructions for protecting a network service device, comprising executable code which when executed by one or more processors, causes the one or more processors to:

activate a timer for a predetermined time period;

during the activation of the timer, receive a first request to establish a connection with the network service device and determine whether the first request originated from a legitimate source;

in response to determining that the first request originated from the legitimate source, add the legitimate source to a trust list comprising one or more trusted sources;

after expiration of the timer, receive a data packet to be transmitted to the network service device and determine a type of connection request associated with the data packet;

in response to the determining the type of connection request associated with the data packet is a new connection request, determine whether the data packet originated from any of the trusted sources in the trust list;

in response to the determining indicating that the data packet originated from at least one of the trusted sources in the trust list, transmit the data packet to the network service device; and in response to the determining the type of connection request associated with the data packet is an established connection before the activation of the timer, transmit the data packet to the network service device.

12. The non-transitory computer readable medium of claim 11, wherein the data packet comprises a second request to establish a connection with the network service device, the one or more processors are further configured to, in response to determining that the second request did not originate from any of the trusted sources in the trust list, determine whether another source the second request originated from is a legitimate source; and in response to determining that the another source is not a legitimate source, restrict a transmission of the second request to the network service device.

13. The non-transitory computer readable medium of claim 11, the one or more processors are further caused to:

in response to determining that the data packet did not originate from any of the trusted sources in the trust list, restrict a transmission of the data packet to the network service device, wherein the restricting the transmission of the data packet to the network service device comprising at least one of:

discarding the received data packet;

performing a further inspection of the data packet before transmitting the data packet to the network service device; or reducing a transmission priority on the transmission of the data packet to the network service device.

14. The non-transitory computer readable medium of claim 13, wherein reduce the transmission priority comprises set a transmission rate upper limit on the transmission of the data packet to the network service device based on at least one of the following:

an elapsed period of time after a switchover from the network service device to a backup network device;

a ratio of a number of new connection data packets to a number of existing connection data packets, the new connection data packets representing data packets for establishing a connection with the network service device within a set of the data packets received after the expiration of the timer, and the existing connection data packets representing data packets associated with the connection established before the activation of the timer within the set of the data packets; or a ratio of the number of data packet originated from any trusted sources in the trust list to the number of data packet not originated from any trusted sources in the trust list.

15. The non-transitory computer readable medium of claim 11, wherein the determining whether the first request originated from a legitimate source comprises:

transmitting a response comprising an identifier for the requested connection to a source the first request originated from; and in response to receiving a request to reset the requested connection from the source, determining that the first request originated from a legitimate source.

16. A network traffic management system, comprising one or more traffic management apparatuses, server devices, or client devices, the network traffic management system comprising memory comprising programmed instructions stored thereon and one or more processors configured to execute the stored programmed instructions to:

activate a timer for a predetermined time period;

during the activation of the timer, receive a first request to establish a connection with a network service device and determine whether the first request originated from a legitimate source;

in response to determining that the first request originated from the legitimate source, add the legitimate source to a trust list comprising one or more trusted sources;

after expiration of the timer, receive a data packet to be transmitted to the network service device and determine a type of connection request associated with the data packet;

in response to the determining the type of connection request associated with the data packet is a new connection request, determine whether the data packet originated from any of the trusted sources in the trust list;

in response to the determining indicating that the data packet originated from at least one of the trusted sources in the trust list, transmit the data packet to the network service device; and in response to the determining the type of connection request associated with the data packet is an established connection before the activation of the timer, transmit the data packet to the network service device.

17. The network traffic management system of claim 16, wherein the data packet comprises a second request to establish a connection with the network service device, the one or more processors are further configured to, in response to determining that the second request did not originate from any of the trusted sources in the trust list, determine whether another source the second request originated from is a legitimate source; and in response to determining that the another source is not a legitimate source, restrict a transmission of the second request to the network service device.

18. The network traffic management system of claim 16, the one or more processors are further configured to:

in response to determining that the data packet did not originate from any of the trusted sources in the trust list, restrict a transmission of the data packet to the network service device, the restricting the transmission of the data packet to the network service device comprising at least one of:

discarding the received data packet;

performing a further inspection of the data packet before transmitting the data packet to the network service device; or reducing a transmission priority on the transmission of the data packet to the network service device.

19. The network traffic management system of claim 18, wherein reduce the transmission priority comprises set a transmission rate upper limit on the transmission of the data packet to the network service device based on at least one of the following:

an elapsed period of time after a switchover from the network service device to a backup network device;

a ratio of a number of new connection data packets to a number of existing connection data packets, the new connection data packets representing data packets for establishing a connection with the network service device within a set of the data packets received after the expiration of the timer, and the existing connection data packets representing data packets associated with the connection established before the activation of the timer within the set of the data packets; or a ratio of the number of data packet originated from any trusted sources in the trust list to the number of data packet not originated from any trusted sources in the trust list.

20. The network traffic management system of claim 16, wherein the determining whether the first request originated from a legitimate source comprises:

transmitting a response comprising an identifier for the requested connection to a source the first request originated from; and in response to receiving a request to reset the requested connection from the source, determining that the first request originated from a legitimate source.

* * * * *